(12) United States Patent
Kimura

(10) Patent No.: US 8,140,880 B2
(45) Date of Patent: Mar. 20, 2012

(54) DATA CONTROL UNIT

(75) Inventor: Hiromitsu Kimura, Kyoto-fu (JP)

(73) Assignee: Rohm Co., Ltd., Kyoto-fu (JP)

( * ) Notice: Subject to any disclaimer, the term of this patent is extended or adjusted under 35 U.S.C. 154(b) by 488 days.

(21) Appl. No.: 12/369,877

(22) Filed: Feb. 12, 2009

(65) Prior Publication Data

US 2009/0210738 A1    Aug. 20, 2009

(30) Foreign Application Priority Data

Feb. 14, 2008 (JP) ................................. 2008-033721

(51) Int. Cl.
*G06F 1/26* (2006.01)
(52) U.S. Cl. ........................................................ 713/340
(58) Field of Classification Search .................... 713/300
See application file for complete search history.

(56) References Cited

U.S. PATENT DOCUMENTS

| | | | | |
|---|---|---|---|---|
| 4,458,307 A * | 7/1984 | McAnlis et al. | ................ | 714/22 |
| 5,606,511 A * | 2/1997 | Yach | ............... | 702/64 |
| 7,093,167 B2 * | 8/2006 | Komiya | .......... | 714/44 |
| 7,493,506 B2 * | 2/2009 | Balasubramanian et al. | | 713/330 |
| 7,589,568 B2 * | 9/2009 | Steedman et al. | ............ | 327/77 |
| 7,639,052 B2 * | 12/2009 | Xiao et al. | ............... | 327/143 |
| 2008/0005451 A1 * | 1/2008 | Tanigawa | .................... | 711/103 |
| 2008/0048715 A1 * | 2/2008 | Balasubramanian et al. | .. | 326/37 |
| 2008/0061822 A1 * | 3/2008 | Balasubramanian et al. | .. | 326/38 |
| 2008/0246509 A1 * | 10/2008 | Xiao et al. | ................ | 326/39 |
| 2008/0272830 A1 * | 11/2008 | Steedman et al. | ............ | 327/530 |
| 2010/0060331 A1 * | 3/2010 | Xiao et al. | .................... | 327/143 |

FOREIGN PATENT DOCUMENTS

| | | |
|---|---|---|
| EP | 1986323 A2 * | 10/2008 |
| JP | 06-231053 | 8/1994 |
| JP | 09-081286 | 3/1997 |
| JP | 2004-186874 | 7/2004 |

* cited by examiner

*Primary Examiner* — Ryan Stiglic
(74) *Attorney, Agent, or Firm* — Fish & Richardson P.C.

(57) ABSTRACT

A data control unit includes a primary power supply line to which a primary power supply voltage is supplied; a secondary power source line to which a secondary power supply voltage is supplied; a voltage converter for converting the primary power supply voltage into the secondary power supply voltage; a voltage level detection unit which is connected to the primary power source line, and outputs a voltage level detection signal; a reset signal generator which is connected to the secondary power source line, and outputs a reset signal; and a control signal generation unit which receives the voltage level detection signal and the reset signal, and outputs a control signal. The data control unit detects power supply cutoff, and secures the time for sufficient backup process.

14 Claims, 9 Drawing Sheets

DATA CONTROL UNIT

CROSS REFERENCE TO RELATED APPLICATIONS AND INCORPORATION BY REFERENCE

This application is based upon and claims the benefit of priority from prior Japanese Patent Applications No. P2008-33721 filed on Feb. 14, 2008, the entire contents of which are incorporated herein by reference.

TECHNICAL FIELD

The present invention relates to a data control unit. In particular, the present invention relates to a data control unit which can detect power supply cutoff and can secure time for sufficient backup process.

BACKGROUND ART

Generally, since data currently treated in an electronic circuit disappears with a stop of the current supply resulting from a power failure, battery deterioration, etc., even if it turns ON a power supply again, it cannot resume a process. As a method of solving this, there is a method for backing up stored data to a nonvolatile storage and holding data, when the power supply cutoff is detected. A data hold device and data holding method using a nonvolatile storage device are already disclosed (for example, refer to Patent Literature 1).

In the above-mentioned method, a control device which detects power supply cutoff/turn-on and outputs a signal for request for backup/recovering of data is used toward a controlled system device having a function for performing fixation of the data. Since these control devices process after the power supply cutoff detection, it is necessary to secure another power supply. However, using a battery causes cost increase. In order to solve this problem, "DATA RESTORING METHOD" is proposed as the method of processing by utilizing discharging time of a capacitor (for example, refer to Patent Literature 2).

On the other hand, "PROGRAMMABLE CONTROLLER AND DISPOSAL METHOD AT THE TIME OF POWER OFF FOR THE SAME" for monitoring the power supply lines of two systems (for example, AC 100V side and DC 5V side, etc.) is already disclosed (for example, refer to Patent Literature 3). However, the method disclosed in the Patent Literature 3 does not set up power source monitor time, and is targeted for only at the time of a stop of the device.

Citation List
Patent Literature 1: Japanese Patent Application Laying-Open Publication No. 2004-186874
Patent Literature 2: Japanese Patent Application Laying-Open Publication No. H06-231053
Patent Literature 3: Japanese Patent Application Laying-Open Publication No. H09-081286

SUMMARY OF THE INVENTION

Technical Problem
When utilizing the discharging time of a capacitor and performing the process after power supply cutoff, it is useful from the view point of cost to secure needed processing time using the capacitor of small capacity as much as possible. However, in the above-mentioned method, it is necessary to enlarge capacity of a capacitor in order to secure processing time.

When utilizing the discharging time of a capacitor and performing the process after power supply cutoff, since it is necessary to detect power supply cutoff in the range in which the system can operate, it is necessary to set up the voltage level to detect more highly. Usually, for example, in the power supply of 3.3V, when about 3.1V is detected, it is set to regarding as the power supply cutoff etc.

In this case, when the value of power supply voltage is varied by a noise on a power supply line, etc., a possibility of being regarded as the power supply cutoff is high, a useless backup process occurs as a result, and normal operation is prevented.

The purpose of the invention is to provide a data control unit, which can secure the period for sufficient backup process which can be processed, when detecting the power supply cutoff/turn-on and outputting the signal for requesting a backup (data restoring/recovery) of data.

Solution to Problem

According to an aspect of the invention, a data control unit comprises a controlled target circuit which has a nonvolatile storage element and performs a predetermined operation; a power supply voltage converter for converting a primary power supply voltage into a secondary power supply voltage; and a detection/control unit for detecting variation of a potential of each of the primary power supply voltage and the secondary power supply voltage, and outputting a control signal which transfers data in the controlled target circuit to the nonvolatile storage element toward the controlled target circuit.

According to another aspect of the invention, a data control unit comprises a voltage level detection unit for monitoring a voltage level of a power supply; and a control signal generation unit for outputting a control signal for requesting backup of data of a controlled target circuit in the voltage level detection unit when a voltage level of cutoff/turn-on of the power supply is detected.

According to another aspect of the invention, a data control unit comprises a nonvolatile CPU including a nonvolatile storage element; a power supply voltage converter for converting a primary power supply voltage into a secondary power supply voltage; a voltage level detection unit which the primary power supply voltage is inputted and outputs a voltage detection signal; a reset signal generation unit which the secondary power supply voltage is inputted and outputs a reset signal; a control signal generation unit which the voltage detection signal and the reset signal are inputted, and outputs a control signal and a clock enable signal to the nonvolatile CPU; a clock generation device for outputting a clock signal; and a logic unit for generating an output signal for operating the nonvolatile CPU based on the clock enable signal and the clock signal.

According to another aspect of the invention, a data control unit comprises a primary power supply line to which a primary power supply voltage is supplied; a secondary power source line in which a secondary power supply voltage is supplied; a voltage converter which is placed between the primary power supply line and the secondary power source line, and converts the primary power supply voltage into the secondary power supply voltage; a voltage level detection unit which is connected to the primary power supply line, and outputs a voltage level detection signal; a reset signal generation unit which is connected to the secondary power source line, and outputs a reset signal; and a control signal generation unit which receives the voltage level detection signal and the reset signal, and outputs a control signal.

Advantageous Effects of Invention

According to the data control unit of the present invention, when applying to the controlled system which has a power source line of two systems, the capacity of the capacitor for performing the voltage securing after the power supply cutoff can be applied small.

Moreover, according to the data control unit according to the present invention, when the value of the power supply voltage is varied by the noise on the power source line, etc., a useless backup process (data restoring/recovery) can be suppressed.

DESCRIPTION OF EMBODIMENTS

Figure 1:
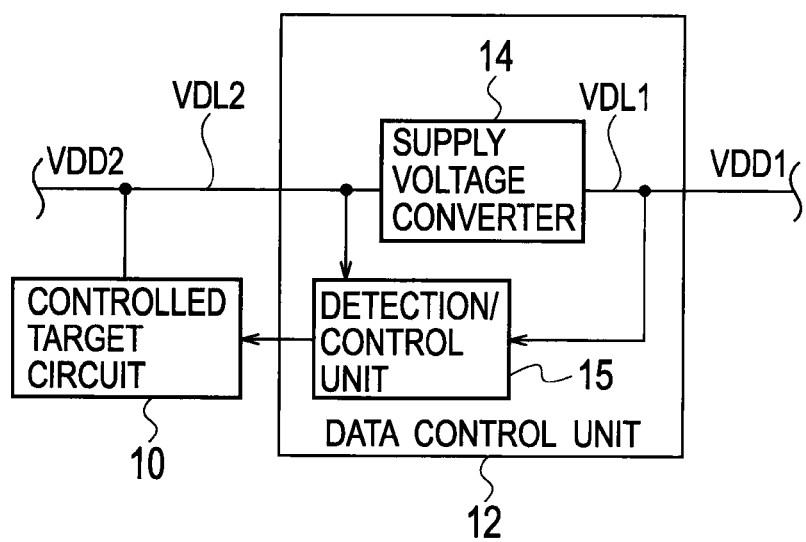
FIG. 1 is a schematic block configuration diagram explaining the theory of operation of a data control unit according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally, and as is conventional in the representation of the circuit blocks, it will be appreciated that the various drawings are not drawn to scale from one figure to another nor inside a given figure, and in particular that the circuit diagrams are arbitrarily drawn for facilitating the reading of the drawings. In the following descriptions, numerous specific details are set forth such as specific signal values, etc. to provide a thorough understanding of the present invention. However, it will be obvious to those skilled in the art that the present invention may be practiced without such specific details. In other instances, circuits well-known have been shown in block diagram form in order to not obscure the present invention with unnecessary detail.

The embodiments shown below exemplify an apparatus and a method that are used to implement the technical ideas according to the present invention, and do not limit the technical ideas according to the present invention to those that appear below. These technical ideas, according to the present invention, may receive a variety of modifications that fall within the claims.

First Embodiment

As shown in FIG. 1, a theoretic block configuration of a data control unit 12 according to a first embodiment of the present invention includes: a primary power supply line VDL1 to which a primary power supply voltage VDD1 is supplied; a secondary power supply line VDL2 to which a secondary power supply voltage VDD2 is supplied; a power supply voltage converter 14 which is placed between the primary power supply line VDL1 and the secondary power supply line VDL2, and converts the primary power supply voltage VDD1 into the secondary power supply voltage VDD2; and a detection/control unit 15 placed between the primary power supply line VDL1 and the secondary power supply line VDL2. As shown in FIG. 1, a controlled target circuit 10 connected to the secondary power supply line VDL2 is connected also to the primary power supply line VDL1 through the detection/control unit 15.

At this point, in the case of the data control unit 12 which uses the power supply of two systems which composes the primary power supply voltage VDD1 and the secondary power supply voltage VDD2, it is assumed that the controlled target circuit 10 which uses the power supply of the system of the secondary power supply voltage VDD2 can be operated within the limits of the secondary power supply voltage VDD2±10% VDD2.

Figure 2:
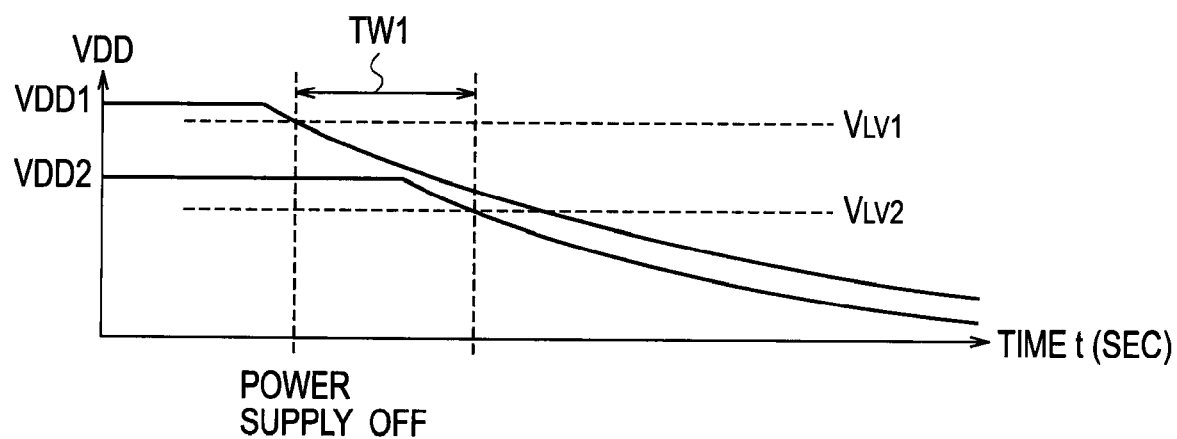
FIG. 2 is a schematic operation waveform chart explaining the theory of operation of the data control unit according to the first embodiment of the present invention.

An operation of the data control unit 12 shown in FIG. 1 is expressed as shown in FIG. 2.

(a) In FIG. 2, before the power supply OFF, the primary power supply voltage VDD1 and the secondary power supply voltage VDD2 (VDD2<VDD1) are supplied to the primary power supply line VDL1 and the secondary power supply line VDL2, respectively.

(b) Next, it is considered that the primary power supply voltage VDD1 is the power supply OFF because the primary power supply voltage VDD1 supplied to the primary power supply line VDL1 is detected that it is power supply cutoff (power supply OFF) as compared with VDD1 detecting voltage level $V_{LV}1$ level (90% VDD1). As shown in FIG. 2, the voltage drop of the primary power supply voltage VDD1 supplied to the primary power supply line VDL1 is performed by a predetermined time constant. On the other hand, the voltage drop of the secondary power supply voltage VDD2 supplied to the secondary power supply line VDL2 is performed by a predetermined time constant, after a fixed state is held.

(c) Next, it is considered that the secondary power supply voltage VDD2 is the power supply OFF because the secondary power supply voltage VDD2 supplied to the secondary power supply line VDL2 is detected that it is power supply cutoff (power supply OFF) as compared with VDD2 detecting voltage level $V_{LV}2$ (90% VDD2). As a result, the controlled target circuit 10 is turned to a not-ready state.

A period from the time point of the primary power supply voltage VDD1 becoming the VDD1 detecting voltage level $V_{LV}1$ and being considered that the primary power supply voltage VDD1 is the power supply OFF to the time point of the secondary power supply voltage VDD2 becoming the VDD2 detecting voltage level $V_{LV}2$, and the controlled target circuit 10 is turned to the not-ready state is a period TW1 which can process backup, such as data restoring/recovery of the controlled target circuit 10 after detection of the power supply cutoff.

According to the data control unit according to the first embodiment of the present invention, it becomes possible to detect the power supply cutoff before secondary power supply voltage VDD2 of the secondary power supply line VDL2 drops by monitoring that the primary power supply voltage VDD1 (VDD2<VDD1) of another system whose power supply voltage is higher than the secondary power supply voltage VDD2, and detecting that the primary power supply voltage VDD1 is the power supply cutoff (power supply OFF) as compared with the VDD1 detecting voltage level $V_{LV}1$. Therefore, the period TW1 which can process the controlled target circuit 10 after the detection of power supply cutoff can be set up widely.

Figure 3:
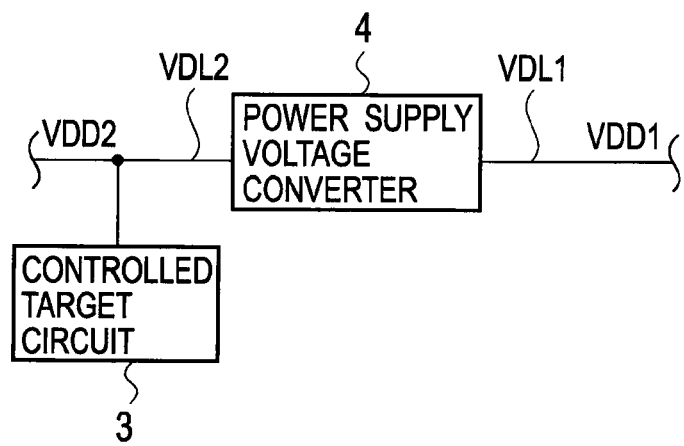
FIG. 3 is a schematic block configuration diagram showing a data control unit according to a comparative example of the first embodiment of the present invention.

On the other hand, as shown in FIG. 3, a schematic block configuration of a data control unit according to the comparative example of the first embodiment of the present invention includes: a primary power supply line VDL1 to which a primary power supply voltage VDD1 is supplied; a secondary power supply line VDL2 to which a secondary power supply voltage VDD2 is supplied; and a power supply voltage converter 4 which is placed between the primary power supply line VDL1 and the secondary power supply line VDL2, and converts the primary power supply voltage VDD1 into the secondary power supply voltage VDD2. As shown in FIG. 3, a controlled target circuit 3 connected to the secondary power supply line VDL2 is not connected to the primary power supply line VDL1.

Figure 4:
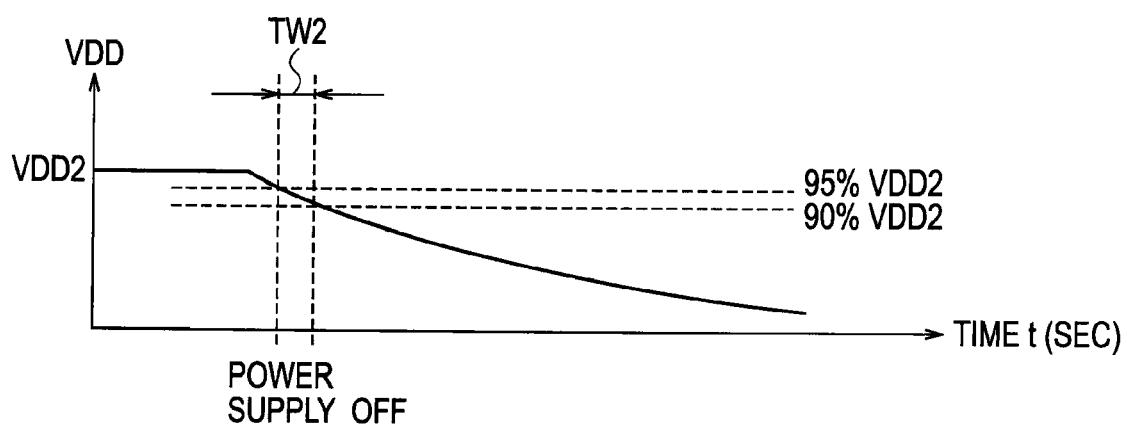
FIG. 4 is a schematic operation waveform chart showing the data control unit according to the comparative example of the first embodiment of the present invention.

An operation of the data control unit shown in FIG. 3 is expressed as shown in FIG. 4.

(a) In FIG. 3, the secondary power supply voltage VDD2 is supplied to the secondary power supply line VDL2 before the power supply OFF. Similarly, the primary power supply voltage VDD1 is supplied to the primary power supply line VDL1.

(b) Next, it is considered that the secondary power supply voltage VDD2 is the power supply OFF because the secondary power supply voltage VDD2 supplied to the secondary power supply line VDL2 is detected that it is power supply cutoff (power supply OFF) as compared with VDD2 detecting voltage level $V_{LV}2$ level (95% VDD2). As shown in FIG. 4, the voltage drop of the secondary power supply voltage VDD2 supplied to the secondary power supply line VDL2 is performed by a predetermined time constant.

(c) Next, the controlled target circuit 3 is turned to a not-ready state because the secondary power supply voltage VDD2 supplied to the secondary power supply line VDL2 is detected that it is power supply cutoff as compared with the VDD2 detecting voltage level $V_{LV}2$ (90% VDD2).

A period from the time point of secondary power supply voltage VDD2 becoming the VDD2 detecting voltage level $V_{LV}2$ (95% VDD2) and being considered that it is the power supply OFF to the time point secondary power supply voltage VDD2 becoming the VDD2 detecting voltage level $V_{LV}2$ (90% VDD2), and the controlled target circuit 3 being turned to the not-ready state is a period TW2 which can process backup, such as data restoring/recovery of the controlled target circuit 3 after the detection of power supply cutoff.

As shown in FIG. 4, the operation of the data control unit according to the comparative example monitors only the secondary power supply voltage VDD2 of the secondary power supply line VDL2 to which the controlled target circuit 3 is connected, and then detects the power supply cutoff. That is, since the power supply cutoff is detected after the secondary power supply voltage VDD2 drops, the time TW2 in which the process is possible after the power supply cutoff detection is short.

When monitoring the voltage level of the primary power supply voltage VDD1 of another system and detecting the power supply cutoff, the voltage level to detect can be set up low as compared with the case where monitor only secondary power supply voltage VDD2 and the power supply cutoff is detected.

When the primary power supply voltage VDD1 of another system is monitored, it is considered that the primary power supply voltage VDD1 is the power supply OFF, and the detection level is 90% of normal operation voltage (VDD1) by detecting the primary power supply voltage VDD1 is power supply cutoff (power supply OFF) as compared with the VDD1 detecting voltage level $V_{LV}1$ level (90% VDD1) as mentioned above.

On the other hand, when monitoring the secondary power supply voltage VDD2 of the secondary power supply line VDL2, as shown in FIG. 4, the detection level is 95% of the normal operation voltage (VDD2).

Therefore, as for the data control unit according to the first embodiment of the present invention, the probability which can absorb fluctuation of the power supply becomes high compared with the comparative example.

(Detailed Block Configuration)

Figure 5:
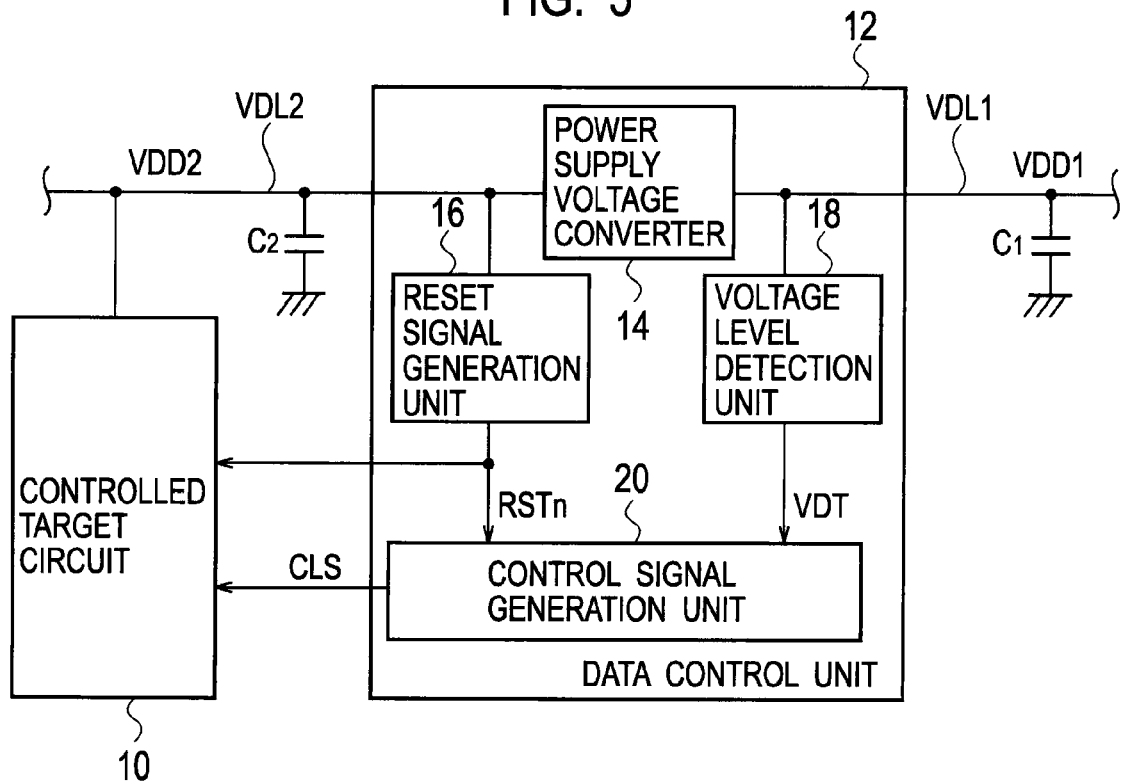
FIG. 5 is a schematic block configuration diagram showing the data control unit according to the first embodiment of the present invention.

As a detailed schematic block configuration is shown in FIG. 5, the data control unit 12 according to the first embodiment of the present invention includes: a primary power supply line VDL1 to which a primary power supply voltage VDD1 is supplied; a secondary power supply line VDL2 to which a secondary power supply voltage VDD2 is supplied; a power supply voltage converter 14 which is placed between the primary power supply line VDL1 and the secondary power supply line VDL2, and converts the primary power supply voltage VDD1 into the secondary power supply voltage VDD2; a voltage level detection unit 18 which is connected to the primary power supply line VDL1, and outputs a voltage level detection signal VDT; a reset signal generation unit 16 which is connected to the secondary power supply line VDL2, and outputs a reset signal RSTn; and a control signal generation unit 20 which receives the voltage level detection signal VDT from the voltage level detection unit 18, receives the reset signal RSTn from the reset signal generation unit 16, and outputs a control signal CLS.

As shown in FIG. 5, a controlled target circuit 10 is connected to the secondary power supply line VDL2, and the controlled target circuit 10 receives the reset signal RSTn from the reset signal generation unit 16 in the data control unit 12, and receives the control signal CLS from the control signal generation unit 20 in the data control unit 12.

Moreover, in FIG. 5, capacitors C1 and C2 are parasitism capacitors which the primary power supply line VDL1 and the secondary power supply line VDL2 have, respectively.

(Operation Timing Chart)

Figure 6:
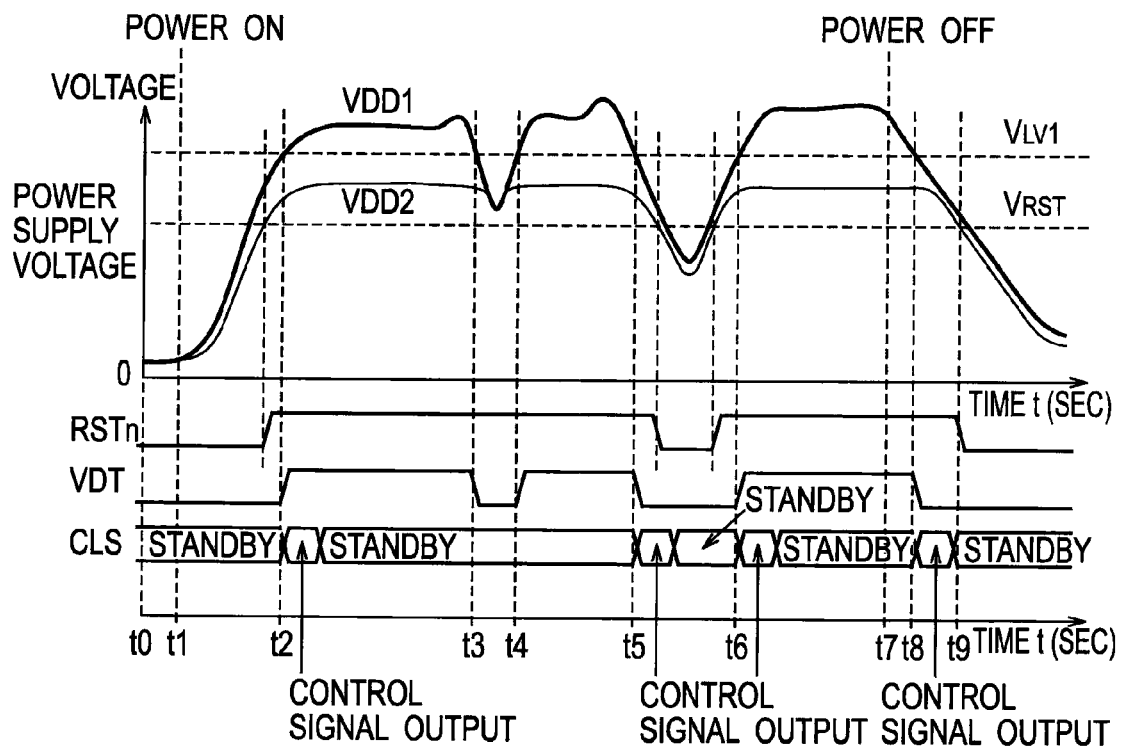
FIG. 6 shows an operation example of the data control unit according to the first embodiment of the present invention, and is an operation waveform chart of primary power supply voltage VDD1, secondary power supply voltage VDD2, a reset signal RSTn, a voltage level detection signal VDT, and a control signal CLS.

FIG. 6 shows an operation example of the data control unit shown in FIG. 5. In FIG. 6, power supply variation waveforms of the primary power supply voltage VDD1 and the secondary power supply voltage VDD2 is shown, and operation waveforms of the reset signal RSTn, the voltage level detection signal VDT, and the control signal CLS is further shown corresponding to these power supply variation waveforms, respectively.

(a) First of all, in the period of the time t0 to the time t1, a power supply is in OFF state. The reset signal RSTn of negative logic is in ON state, the voltage level detection signal VDT is in OFF state, and the control signal CLS is in a standby state.

(b) Next, the power supply is turned ON in the time t1.

(c) Next, in the period of the time t1 to the time t2, the operation waveforms of the primary power supply voltage VDD1 and the secondary power supply voltage VDD2 rises, and when the value of the secondary power supply voltage VDD2 reaches a reset voltage level $V_{RST}$, the reset signal RSTn is turned to the OFF state.

(d) Next, in the time t2, when the value of the primary power supply voltage VDD1 reaches a VDD1 detection voltage level $V_{LV}1$, the voltage level detection signal VDT is turned to the ON state.

(e) Next, in the period of the time t2 to the time t3, the ON state is held for the primary power supply voltage VDD1 and the secondary power supply voltage VDD2. Immediately after the time t2, the control signal CLS is turned from the standby state to the ON state, and the control signal CLS is outputted toward the controlled target circuit 10 from the control signal generation unit 20. Then, the standby state is held.

(f) Next, in the period of the time t3 to the time t4, when the value of the primary power supply voltage VDD1 becomes lower than the VDD1 detection voltage level $V_{LV}1$, and the value of secondary power supply voltage VDD2 also drops and is higher than the reset voltage level $V_{RST}$, although the reset signal RSTn holds the OFF state, the voltage level detection signal VDT is turned to the OFF state. As for the control signal CLS, the standby state is held.

(g) Next, in the period of the time t4 to the time t5, when the value of the primary power supply voltage VDD1 becomes higher than the VDD1 detection voltage level $V_{LV}1$, and the value of the secondary power supply voltage VDD2 also rises and is higher than the reset voltage level $V_{RST}$, although the reset signal RSTn holds the OFF state, the voltage level detection signal VDT is turned to the ON state. As for the control signal CLS, the standby state is held.

(h) Next, in the period of the time t5 to the time t6, when the value of the primary power supply voltage VDD1 becomes lower than the VDD1 detection voltage level $V_{LV}1$, the voltage level detection signal VDT is turned to the OFF state. The control signal CLS is turned to the ON state and the control signal CLS is outputted toward the controlled target circuit 10 from the control signal generation unit 20. Then, the standby state is held.

When the value of the primary power supply voltage VDD1 further drops, and the value of the secondary power supply voltage VDD2 becomes lower than the reset voltage level $V_{RST}$, the reset signal RSTn is turned to the ON state.

Further, when the primary power supply voltage VDD1 rises, and the value of secondary power supply voltage VDD2 becomes higher than reset voltage level $V_{RST}$, the reset signal RSTn is turned to the OFF state.

Further, when the primary power supply voltage VDD1 rises and becomes higher than the VDD1 detection voltage level $V_{LV}1$, as for the reset signal RSTn, the OFF state is held, and the voltage level detection signal VDT is turned to the ON state.

(i) Next, in the period of the time t6 to the time t7, the ON state is held for both the primary power supply voltage VDD1 and the secondary power supply voltage VDD2. Immediately after the time t6, the control signal CLS is turned from the standby state to the ON state, and the control signal CLS is outputted toward the controlled target circuit 10 from the control signal generation unit 20. Then, the standby state is held.

(j) Next, the power supply is turned OFF in the time t7.

(k) Next, in the period of the time t7 to the time t8, the operation waveform of the primary power supply voltage VDD1 drops, and, on the other hand, the operation waveform of the secondary power supply voltage VDD2 holds a substantially constant value.

(l) Next, in the time t8, when the value of the primary power supply voltage VDD1 reaches the VDD1 detection voltage level $V_{LV}1$, the reset signal RSTn holds the OFF state, but the voltage level detection signal VDT is turned to the OFF state.

(m) Next, in the period of the time t8 to the time t9, as for the primary power supply voltage VDD1, the voltage drops by a predetermined time constant, as shown in FIG. 6. On the other hand, as for the secondary power supply voltage VDD2, the voltage drops by a predetermined time constant, after a fixed state is held. Immediately after the time t8, the control signal CLS is turned from the standby state to the ON state, and the control signal CLS is outputted toward the controlled target circuit 10 from the control signal generation unit 20.

(n) Next, in the time t9, the controlled target circuit 10 is turned to the not-ready state because the secondary power supply voltage VDD2 reaches the reset voltage level $V_{RST}$ and it detects power supply cutoff (power supply OFF). Simultaneously, the reset signal RSTn is turned the ON state, the voltage level detection signal VDT holds the OFF state, and the control signal CLS is turned to the standby state.

According to the data control unit according to the first embodiment of the present invention, when applying to the controlled target circuit system which has the power source lines of two systems, since the time constant by the capacitor which the power source line has is not used, the capacity of the capacitor for performing voltage securing after the power supply cutoff can be applied small.

Moreover, according to the data control unit according to the first embodiment of the present invention, when the value of the power supply voltage is varied by the noise on the power source line, etc., a useless backup process (data restoring/recovery) can be suppressed.

Second Embodiment (Data Control Unit)

Figure 7:
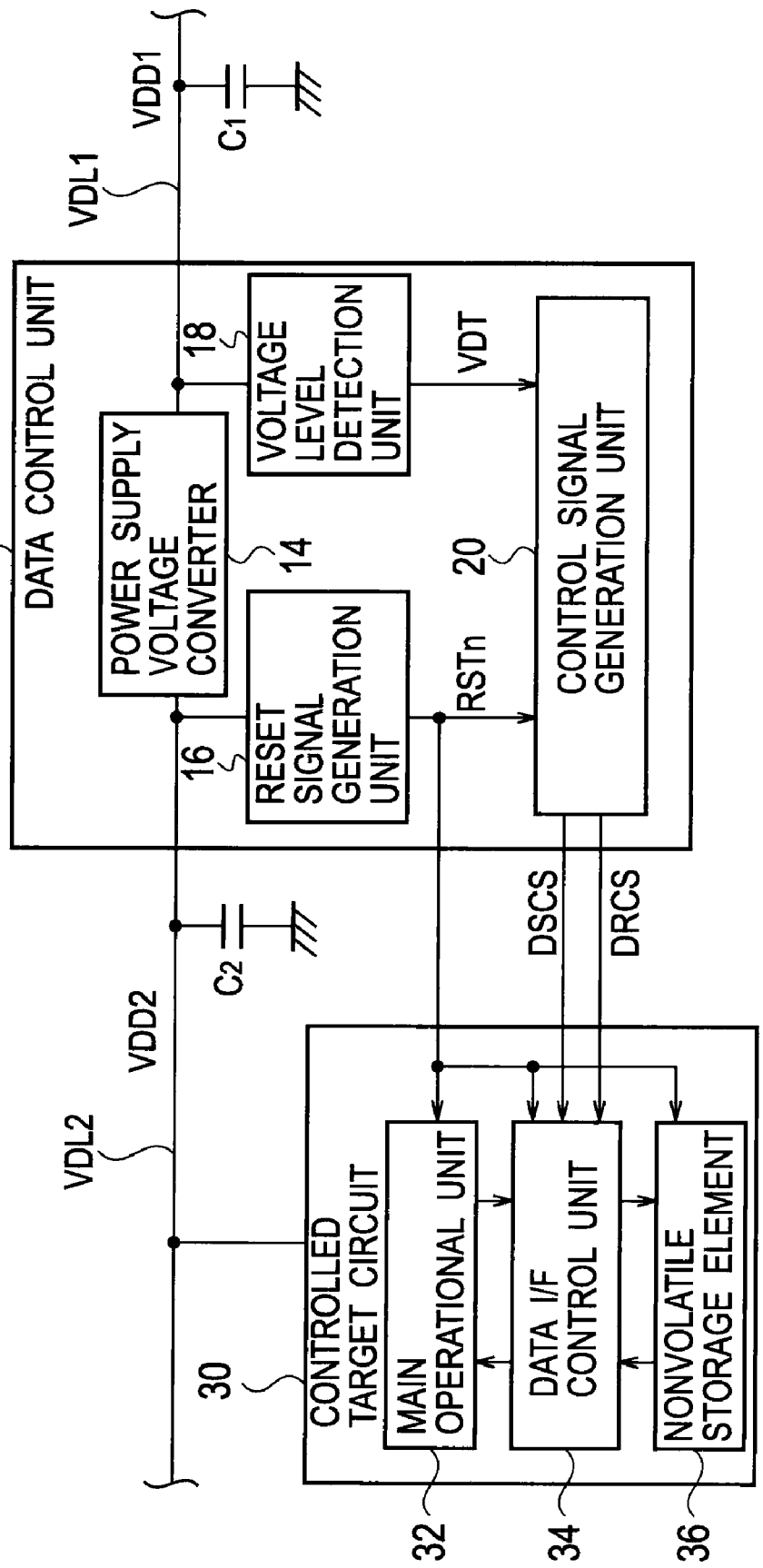
FIG. 7 shows a data control unit according to a second embodiment of the present invention, and is a schematic block configuration diagram shoeing the data control unit which performs data restoring/recovery control.

As shown in FIG. 7, a data control unit 12 which is a data control unit according to the second embodiment of the present invention and performs a data restoring/recovery control operation includes: a primary power supply line VDL1 to which a primary power supply voltage VDD1 is supplied; a secondary power source line VDL2 to which a secondary power supply voltage VDD2 is supplied; a power supply voltage converter 14 which is placed between the primary power source line VDL1 and the secondary power source line VDL2, and converts the primary power supply voltage VDD1 into the secondary power supply voltage VDD2; a voltage level detection unit 18 which is connected to the primary power source line VDL1, and outputs a voltage level detection signal VDT; a reset signal generator 16 which is connected to the secondary power source line VDL2, and outputs a reset signal RSTn; and a control signal generation unit 20 which receives the voltage level detection signal VDT from the voltage level detection unit 18, receives reset signal RSTn from the reset signal generation unit 16, and outputs a data restoring control signal DRCS and a data recovery control signal DSCS.

As shown in FIG. 7, a controlled target circuit 30 is connected to the secondary power source line VDL2. The controlled target circuit 30 receives the reset signal RSTn from the reset signal generation unit 16 in the data control unit 12, and receives the data restoring control signal DRCS and the data recovery control signal DSCS from the control signal generation unit 20.

The controlled target circuit 30 includes a main operational unit 32, a nonvolatile storage element 36, and a data interface control unit 34 between the main operational unit 32 and the nonvolatile storage element 36, as shown in FIG. 7.

As shown in FIG. 7, the main operational unit 32, the data interface control unit 34, and the nonvolatile storage element 36 in the controlled target circuit 30 receive the reset signal RSTn from the reset signal generation unit 16 in the data control unit 12, and the data interface control unit 34 receives the data restoring control signal DRCS and the data recovery control signal DSCS from the control signal generation unit 20.

Moreover, in FIG. 7, capacitors C1 and C2 are parasitism capacitors which the primary power source line VDL1 and secondary power source line VDL2 have, respectively.

(Operating Sequence of Data Control Unit)

Figure 8:
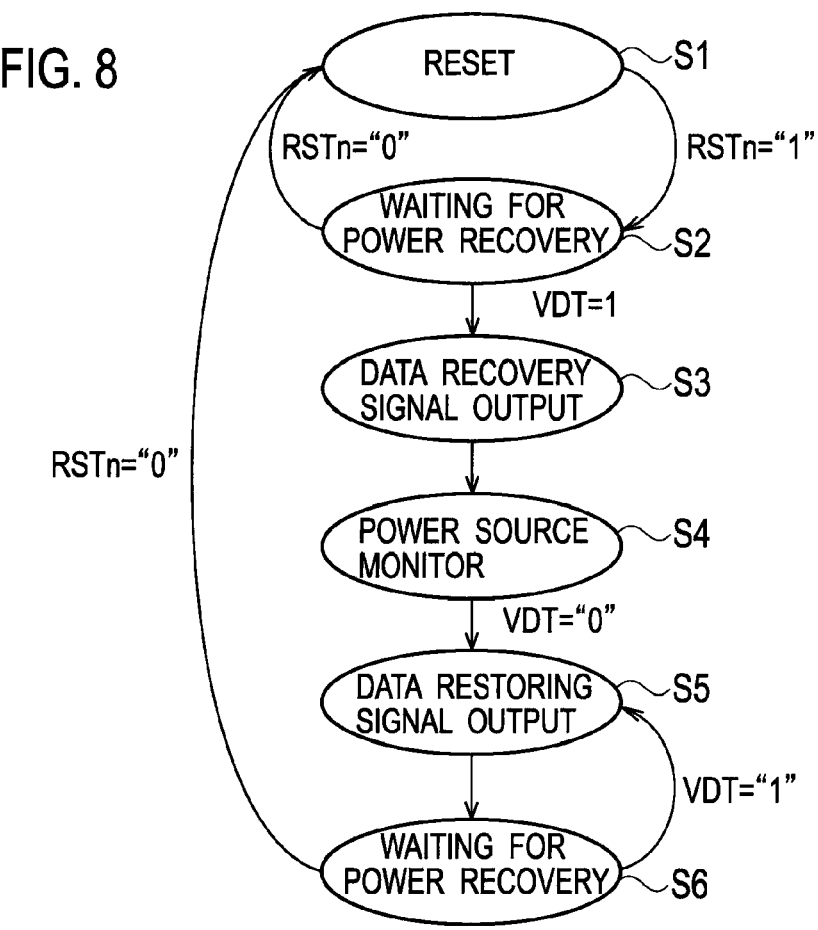
FIG. 8 is a state transition diagram explaining an operating sequence of the data control unit according to the second embodiment of the present invention.

An operating sequence of the data control unit 12 according to the second embodiment of the present invention will be explained using the state transition diagram showing in FIG. 8.

A reset state S1 indicates the state where the data control unit 12 is held while being a reset state, and is not operating.

A power recovery waiting state S2 indicates the state where the primary power supply voltage VDD1 is standing by until becoming certain specific threshold voltage Vth1 (for example, the VDD1 detecting voltage level $V_{LV}1$).

A data recovery signal output state S3 indicates the state where the data recovery control signal DSCS toward the controlled target circuit 30 is sent from the data control unit 12, and data is recovered from the nonvolatile storage element 36 in the controlled target circuit 30.

A power source monitor state S4 indicates the state where it is checking and monitoring whether or not the primary power supply voltage VDD1 is a level which is less than specific threshold voltage Vth1 (for example, the VDD1 detecting voltage level $V_{LV}1$).

A data restoring signal output state S5 indicates the state where the data restoring control signal DRCS is sent toward the controlled target circuit 30 from the data control unit 12, and data is restored to the nonvolatile storage element 36 in the controlled target circuit 30.

—Operating Sequence—

(a) First of all, in the reset state S1, as shown by RSTn="1", when the reset signal RSTn is turned to OFF state, the state shifts from the reset state S1 to the power recovery waiting state S2.

(b) Next, in the power recovery waiting state S2, as shown by RSTn="0", when the reset signal RSTn is turned to ON state, the state shifts from the power recovery waiting state S2 to the reset state S1.

(c) Next, in the power recovery waiting state S2, as shown by VDT="1", when the voltage level detection signal VDT is turned to the ON state, the state shifts from the power recovery waiting state S2 to the data recovery signal output state S3.

(d) Next, the state shifts from the data recovery signal output state S3 to the power source monitor state S4.

(e) Next, in the power source monitor state S4, as shown by VDT="0", when the voltage level detection signal VDT is turned to the OFF state, the state shifts from the power source monitor state S4 to the data restoring signal output state S5.

(f) Next, the state shifts from the data restoring signal output state S5 to the power recovery waiting state S6.

(g) Next, in the power recovery waiting state S6, as shown by VDT="1", when the voltage level detection signal VDT is turned to the ON state, the state shifts from the power recovery waiting state S6 to the data restoring signal output state S5.

(h) Next, in the power recovery waiting state S6, as shown by RSTn="0", when the reset signal RSTn is turned to the OFF state, the state shifts from the power recovery waiting state S6 to the reset state S1.

(Operation Timing Chart)

Figure 9:
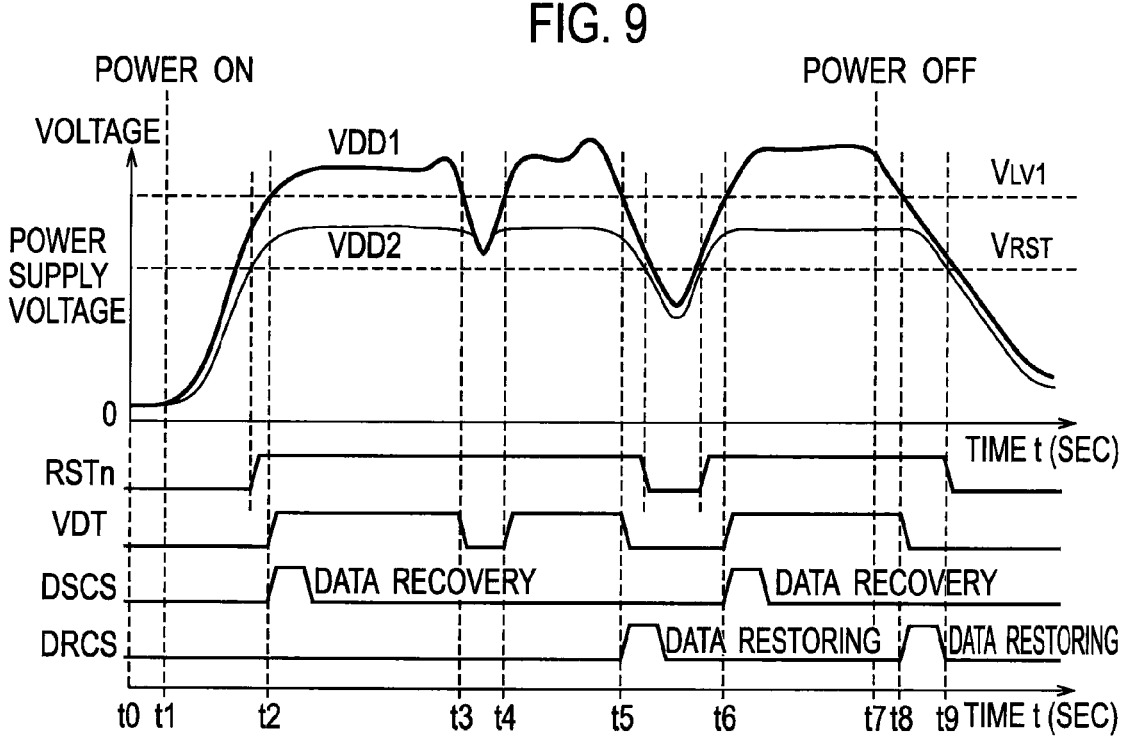
FIG. 9 shows an operation example of the data control unit according to the second embodiment of the present invention, and is an operation waveform chart of primary power supply voltage VDD1, secondary power supply voltage VDD2, a reset signal RSTn, a voltage level detection signal VDT, a data recovery control signal DSCS, and a data restoring control signal DRCS.

FIG. 9 shows an operation example of the data control unit 12 shown in FIG. 7. In FIG. 9, the power supply variation waveform of the primary power supply voltage VDD1 and the secondary power supply voltage VDD2 is shown, and the operation waveform of the reset signal RSTn, the voltage level detection signal VDT, the data recovery control signal DSCS, and the data restoring control signal DRCS is shown, respectively, corresponding to these power supply variation waveforms.

(a) First of all, in the period of the time t0 to the time t1, a power supply is in OFF state. The reset signal RSTn of negative logic is in ON state, the voltage level detection signal VDT is in OFF state, and the data restoring control signal DRCS and the data recovery control signal DSCS are in OFF state.

(b) Next, the power supply is turned ON in the time t1.

(c) Next, in the period of the time t1 to the time t2, the operation waveforms of the primary power supply voltage VDD1 and the secondary power supply voltage VDD2 rises, and when the value of the secondary power supply voltage VDD2 reaches the reset voltage level $V_{RST}$, the reset signal RSTn is turned to the OFF state.

(d) Next, in the time t2, when the value of the primary power supply voltage VDD1 reaches the VDD1 detection voltage level $V_{LV}1$, the voltage level detection signal VDT is turned to the ON state.

(e) Next, in the period of the time t2 to the time t3, the ON state is held for both the primary power supply voltage VDD1 and the secondary power supply voltage VDD2. Immediately after the time t2, the data recovery control signal DSCS is turned from the OFF state to the ON state, and the data recovery control signal DSCS is outputted toward the data interface control unit 34 of the controlled target circuit 30 from the control signal generation unit 20. Then, the OFF state is held.

(f) Next, in the period of the time t3 to t4, when the value of the primary power supply voltage VDD1 becomes lower than the VDD1 detection voltage level $V_{LV}1$, and the value of the secondary power supply voltage VDD2 also drops and is higher than the reset voltage level $V_{RST}$, although the reset signal RSTn holds the OFF state, the voltage level detection signal VDT is turned to the OFF state. As for the data recovery control signal DSCS, the OFF state is held.

(g) Next, in the period of the time t4 to the time t5, when the value of the primary power supply voltage VDD1 becomes higher than the VDD1 detection voltage level $V_{LV}1$, and the value of the secondary power supply voltage VDD2 also rises and is higher than the reset voltage level $V_{RST}$, although the reset signal RSTn holds the OFF state, the voltage level detection signal VDT is turned to the ON state. The data restoring control signal DRCS and the data recovery control signal DSCS are in the OFF state.

(h) Next, in the period of the time t5 to the time t6, when the value of the primary power supply voltage VDD1 becomes lower than the VDD1 detection voltage level $V_{LV}1$, the voltage level detection signal VDT is turned to the OFF state. At this point, the data restoring control signal DRCS is turned to the ON state, and the data restoring control signal DRCS is outputted toward the data interface control unit 34 of the controlled target circuit 30 from the control signal generation unit 20. Then, the OFF state is held.

Further, when the value of the primary power supply voltage VDD1 drops, and the value of the secondary power supply voltage VDD2 becomes lower than the reset voltage level $V_{RST}$, the reset signal RSTn is turned to the ON state.

Furthermore, when the primary power supply voltage VDD1 rises, and the secondary power supply voltage VDD2 becomes higher than the reset voltage level $V_{RST}$, the reset signal RSTn turned to the OFF state.

Furthermore, when the primary power supply voltage VDD1 rises and becomes higher than the VDD1 detection voltage level $V_{LV}1$, as for the reset signal RSTn, the OFF state is held, and the voltage level detection signal VDT is turned to the ON state.

(i) Next, in the period of the time t6 to the time t7, the ON state is held for both the power primary supply voltage VDD1 and the secondary power supply voltage VDD2. Immediately after the time t6, the data recovery control signal DSCS is turned from the OFF state to the ON state, and the data recovery control signal DSCS is outputted toward the data interface control unit 34 of the controlled target circuit 30 from the control signal generation unit 20. Then, the OFF state is held.

(j) Next, the power supply is turned OFF in the time t7.

(k) Next, in the period of the time t7 to the time t8, the operation waveform of the primary power supply voltage VDD1 drops, and, on the other hand, the operation waveform of the secondary power supply voltage VDD2 holds a substantially constant value.

(l) Next, in the time t8, when the value of the primary power supply voltage VDD1 reaches the VDD1 detection voltage level $V_{LV}1$, the reset signal RSTn holds OFF state, but the voltage level detection signal VDT is turned to OFF state.

(m) Next, in the period of the time t8 to the time t9, as the primary power supply voltage VDD1 is shown in FIG. 9, the voltage drops by a predetermined time constant. On the other hand, as for the secondary power supply voltage VDD2, the voltage drops by a predetermined time constant after a fixed state is held. Immediately after the time t8, the data restoring control signal DRCS is turned from the OFF state to the ON state, and the data restoring control signal DRCS is outputted toward the data interface control unit 34 of the controlled target circuit 30 from the control signal generation unit 20.

(n) Next, in the time t9, it is considered that the secondary power supply voltage VDD2 is the power supply OFF, and the controlled target circuit 30 is turned to a not-ready state, because the secondary power supply voltage VDD2 reaches the reset voltage level $V_{RST}$ and it detects power supply cutoff (power supply OFF). Simultaneously, the reset signal RSTn is turned to the ON state, the voltage level detection signal VDT holds the OFF state, and both the data restoring control signal DRCS and the data recovery control signal DSCS are turned to the OFF state.

At the time of power recovery, the power recovery state is detected by monitoring the voltage level of the primary power supply voltage VDD1, and detecting that the primary power supply voltage VDD1 became VDD1>$V_{LV}1$ as compared with the VDD1 detecting voltage level $V_{LV}1$. As a result, the data recovery control signal DSCS is outputted to the data interface control unit 34 of the controlled target circuit 30 from the data control unit 12. In the above-mentioned case, the power source monitor of the secondary power supply voltage VDD2 is applied only to the reset signal generation unit 16 of the data control unit 12 with which the power supply is supplied from the secondary power supply voltage VDD2.

According to the data control unit according to the second embodiment of the present invention, when detecting power supply cutoff/turn-on, and outputting the signal for requesting backup (data restoring/recovery) of data, the period for sufficient the backup process which can be processed can be secured.

According to the data control unit according to the second embodiment of the present invention, when applying to the controlled target circuit system which has the power source line of two system, since the time constant by the capacitor which the power source line has is not used, the capacity of the capacitor for performing voltage securing after the power supply cutoff can be applied small.

Moreover, according to the data control unit according to the second embodiment of the present invention, when the value of the power supply voltage is varied by the noise on the power source line, etc., a useless backup process (data restoring/recovery) can be suppressed.

Third Embodiment (Data Control Unit)

Figure 10:
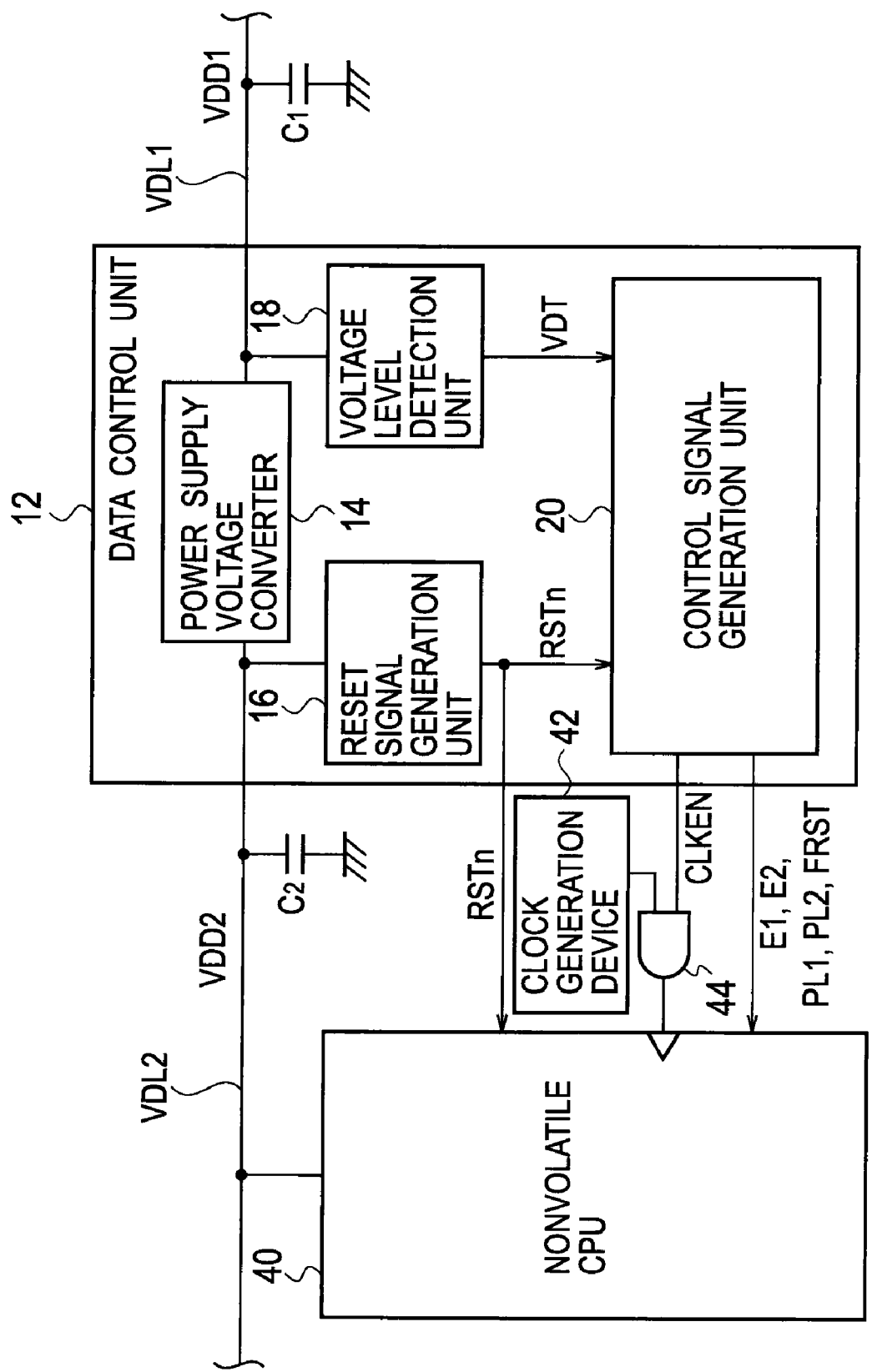
FIG. 10 shows a data control unit according to a third embodiment of the present invention, and is a schematic block configuration diagram showing the data control unit applicable to a nonvolatile CPU.

As shown in FIG. 10, a data control unit 12 which is a data control unit according to a third embodiment of the present invention and applies a nonvolatile CPU 40 as controlled target includes: a primary power supply line VDL1 to which a primary power supply voltage VDD1 is supplied; a secondary power source line VDL2 to which a secondary power supply voltage VDD2 is supplied; a power supply voltage converter 14 which is placed between the primary power source line VDL1 and the secondary power source line VDL2, and converts the primary power supply voltage VDD1 into the secondary power supply voltage VDD2; a voltage level detection unit 18 which is connected to the primary power source line VDL1, and outputs a voltage level detection signal VDT; a reset signal generation unit 16 which is connected to the secondary power source line VDL2, and outputs a reset signal RSTn; and a control signal generation unit 20 which receives the voltage level detection signal VDT from the voltage level detection unit 18, and receives the reset signal RSTn from the reset signal generation unit 16.

The control signal generation unit 20 outputs a ferroelectric element write signal E1, a normal operation signal E2, a ferroelectric element both ends short circuit signal FRST, and ferroelectric element driving signals PL1 and PL2 toward the nonvolatile CPU 40. Moreover, a clock enable signal CLKEN outputted from the control signal generation unit 20 and an output signal from a clock generation device 42 are inputted into an AND gate 44, and an output signal of the AND gate 44 is inputted into the nonvolatile CPU 40.

As shown in FIG. 10, the nonvolatile CPU 40 is connected to the secondary power source line VDL2, and receives the reset signal RSTn from the reset signal generation unit 16 in the data control unit 12, and receives the ferroelectric element write signal E1, the normal operation signal E2, the ferroelectric element both ends short circuit signal FRST, and the ferroelectric element driving signals PL1 and PL2 from the control signal generation unit 20. Moreover, the nonvolatile CPU 40 receives the clock signal CLK through the AND gate 44.

Moreover, in FIG. 10, capacitors C1 and C2 are parasitism capacitors which the primary power source line VDL1 and the secondary power source line VDL2 have, respectively.

(Configuration Example of Nonvolatile CPU)

Figure 11:
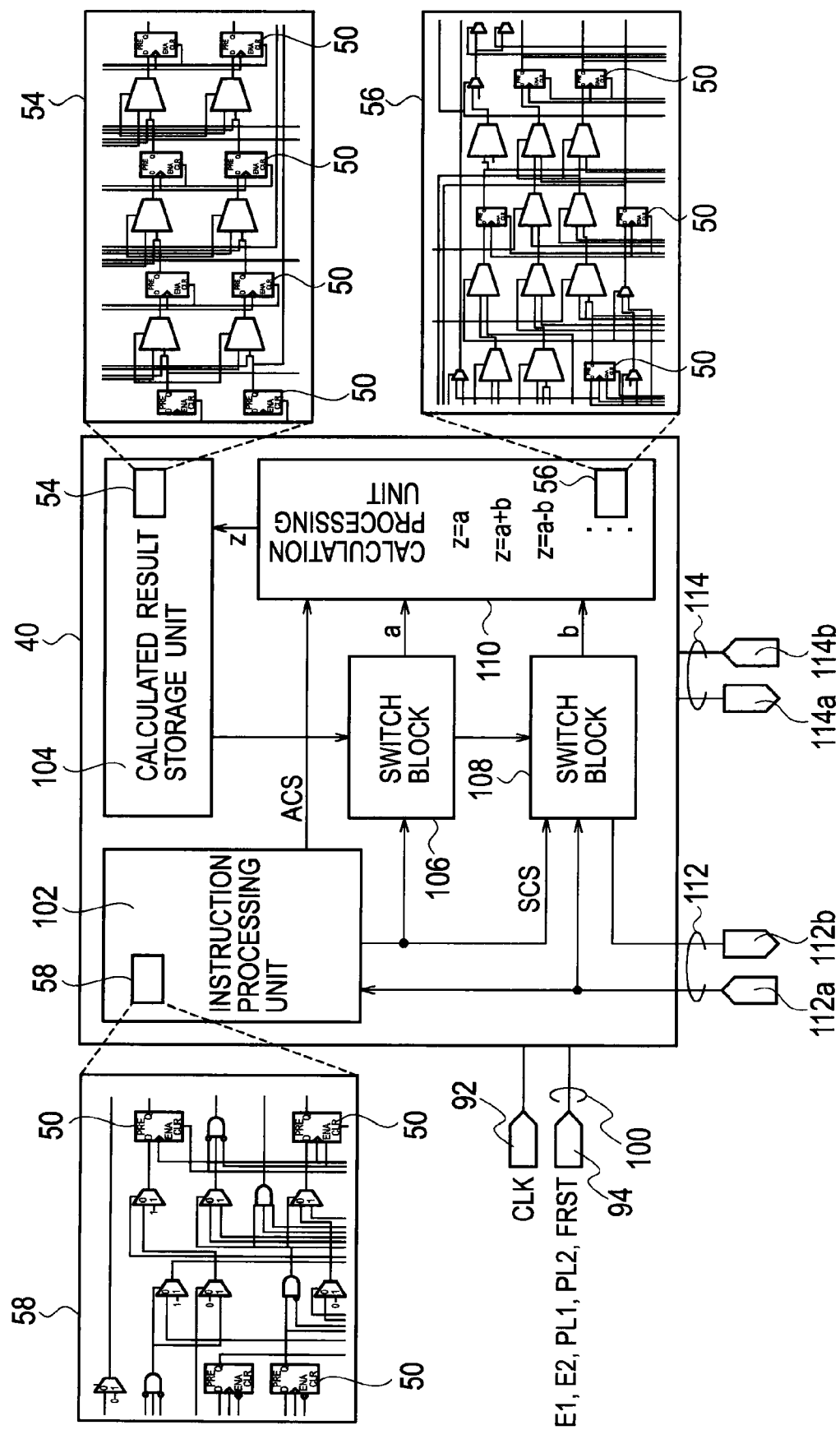
FIG. 11 shows a schematic block configuration example of a nonvolatile CPU which applies the data control unit according to the third embodiment of the present invention.

FIG. 11 shows a schematic block configuration of the nonvolatile CPU 40 which applies the data control unit according to the third embodiment of the present invention. As shown in FIG. 11, the nonvolatile CPU 40 includes: an instruction processing unit 102; an arithmetic processing unit 110 which is connected to the instruction processing unit 102 and receives an arithmetic control signal ACS from the instruction processing unit 102; a calculated result storage unit 104 which is connected to the arithmetic processing section 110 and receives an arithmetic output signal z from the arithmetic processing section 110; a switch block 106 which is connected to the calculated result storage unit 104 and the instruction processing unit 102, and supplies an output signal a to the arithmetic processing section 110; and a switch block 108 which is connected to the switch block 106 and the instruction processing unit 102, receives a switch control signal SCS from the instruction processing unit 102, and supplies an output signal b to the arithmetic processing section 110.

Through a program/data input/output line 112, a program/data input terminal 112*a* is connected to the instruction processing unit 102, and a program/data output terminal 112*b* is connected to the switch block 108.

Moreover, as shown in FIG. 11, a control signal input terminal 114*b* and a control signal output terminal 114*a* are connected to the nonvolatile CPU 40 through a control signal input/output line 114.

Moreover, as shown in FIG. 11, the clock signal CLK is supplied to the nonvolatile CPU 40 through a clock control terminal 92, and the ferroelectric element write signal E1, the normal operation signal E2, the ferroelectric element driving signals PL1 and PL2, and the ferroelectric element both ends short circuit signal FRST are supplied the nonvolatile CPU 40 through a nonvolatile operation control terminal 94 connected to a nonvolatile operation control line 100.

Moreover, as shown in FIG. 11, the instruction processing unit 102 includes a logic circuit block 58 which has a nonvolatile memory gate 50, the calculated result storage unit 104 includes a logic circuit block 54 which has a nonvolatile memory gate 50, and the arithmetic processing unit 110 includes a logic circuit block 56 which has a nonvolatile memory gate 50.

(Configuration Example of Nonvolatile Memory Gate)

Figure 12:
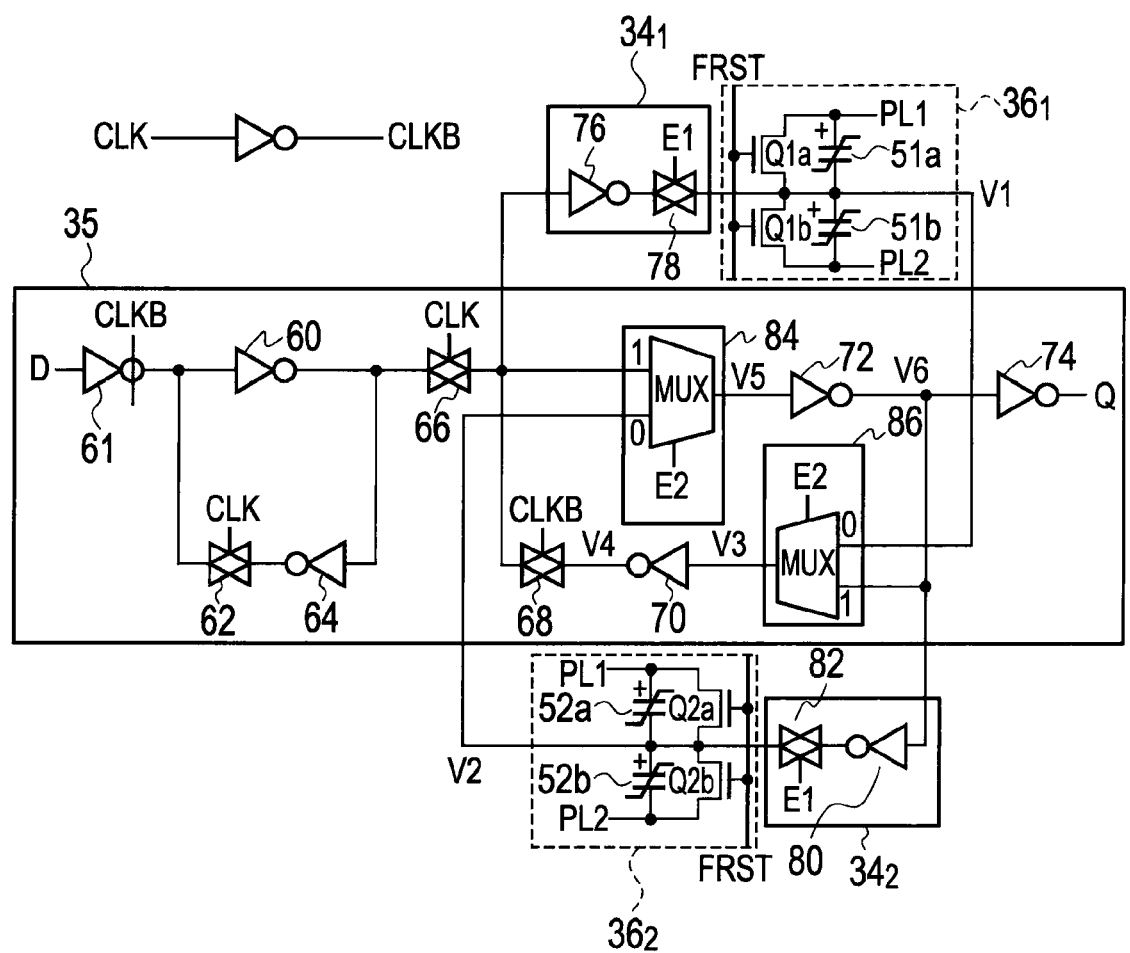
FIG. 12 shows an example of a schematic circuit configuration of a nonvolatile memory gate applied to the nonvolatile CPU shown in FIG. 11.

FIG. 12 shows a configuration example of the nonvolatile memory gate 50 applicable to the nonvolatile CPU 40 which is a controlled system of the data control unit according to the third embodiment of the present invention. As shown in FIG. 12, the nonvolatile memory gate 50 includes: first and second nonvolatile storage elements (NVSE) $36_1$ and $36_2$; a first data interface control unit $34_1$ which is placed adjoining of the first nonvolatile storage element $36_1$, and receives an external control signal for data read-out from the first nonvolatile storage element $36_1$ and the data write to the first nonvolatile storage element $36_1$; a second data interface control unit $34_2$ which is placed adjoining of the second nonvolatile storage element $36_2$, and receives an external control signal for data read-out from the second nonvolatile storage element $36_2$ and the data write to the second nonvolatile storage element $36_2$; and a volatile storage element (VSE) 35 which is placed adjoining of the first data interface control unit $34_1$ and the second data interface control unit $34_2$, receives a data input signal D from a data input terminal, receives a clock signal CLK from a clock input terminal, and outputs a data output signal Q from a data output terminal.

As shown in FIG. 12, the first nonvolatile storage element (NVSE) $36_1$ includes MOS transistors Q1*a* and Q1*b* and ferroelectric capacitors 51*a* and 51*b*, and the second nonvolatile storage element (NVSE) $36_2$ includes MOS transistors Q2*a* and Q2*b* and ferroelectric capacitors 52*a* and 52*b*.

As shown in FIG. 12, the volatile storage element (VSE) 35 includes inverters 60, 61, 64, 70, 72, and 74, pass switches 62, 66, and 68, and multiplexers 84 and 86.

As shown in FIG. 12, the first data interface control unit $34_1$ includes an inverter 76 and a pass switch 78, and the second data interface control unit $34_2$ includes an inverter 80 and a pass switch 82.

An input terminal of the inverter 61 is connected to a voltage applied terminal of the data input signal D. An output terminal of the inverter 61 is connected to an input terminal of the inverter 60. An output terminal of the inverter 60 is connected to a first input terminal (1) of the multiplexer 84 through the pass switch 66. Furthermore, the output terminal of the inverter 60 is connected to an input terminal of the inverter 64, and an output terminal of the inverter 64 is connected to the input terminal of the inverter 60 through the pass switch 62.

An output terminal of the multiplexer 84 is connected to an input terminal of the inverter 72. An output terminal of the inverter 72 is connected to an input terminal of the inverter 74. An output terminal of the inverter 74 is connected to a pulling out terminal of the data output signal Q. A first input terminal (1) of the multiplexer 86 is connected to the output terminal of the inverter 72. An output terminal of the multiplexer 86 is connected to an input terminal of the inverter 70. An output terminal of the inverter 70 is connected to the first input terminal (1) of the multiplexer 84 through the pass switch 68.

Thus, as shown in FIG. 12, the nonvolatile memory gate 50 includes the volatile storage element (VSE) 35 which has a loop structure unit LOOP (a part surrounded by 84, 72, 86, and 70 in FIG. 12) holding the inputted data input signal D, using two logical gates (the inverters 72 and 70 in FIG. 12) connected to loop shape.

An input terminal of the inverter 76 is connected to the first input terminal (1) of the multiplexer 84. An output terminal of the inverter 76 is connected to a second input terminal (0) of the multiplexer 86 through the pass switch 78. An input terminal of the inverter 80 is connected to the first input terminal (1) of the multiplexer 86. An output terminal of the inverter 80 is connected to a second input terminal (0) of the multiplexer 84 through the pass switch 82.

A positive electrode terminal of the ferroelectric capacitor 51a is connected to a first plate line, and the ferroelectric element driving signal PL1 is supplied. A negative electrode terminal of the ferroelectric capacitor 51a is connected to a second input terminal (0) of the multiplexer 86. A MOS transistor Q1a is connected between the both terminals of the ferroelectric capacitor 51a. A gate of the MOS transistor Q1a is connected to a voltage applied terminal of the ferroelectric element both ends short circuit signal FRST.

A positive electrode terminal of the ferroelectric capacitor 51b is connected to the second input terminal (0) of the multiplexer 86. A negative electrode terminal of the ferroelectric capacitor 51b is connected to a second plate line, and the ferroelectric element driving signal PL2 is supplied. A MOS transistor Q1b is connected between the both terminals of the ferroelectric capacitor 51b. A gate of the MOS transistor Q1b is connected to the voltage applied terminal of the ferroelectric element both ends short circuit signal FRST.

A positive electrode terminal of the ferroelectric capacitor 52a is connected to a first plate line, and the ferroelectric element driving signal PL1 is supplied. A negative electrode terminal of the ferroelectric capacitor 52a is connected to a second input terminal (0) of the multiplexer 84. A MOS transistor Q2a is connected between the both terminals of the ferroelectric capacitor 52a. A gate of the MOS transistor Q2a is connected to the voltage applied terminal of the ferroelectric element both ends short circuit signal FRST.

A positive electrode terminal of the ferroelectric capacitor 52b is connected to a second input terminal (0) of the multiplexer 84. A negative electrode terminal of the ferroelectric capacitor 52b is connected to a second plate line, and the ferroelectric element driving signal PL2 is supplied. A MOS transistor Q2b is connected between the both terminals of the ferroelectric capacitor 52b. A gate of the MOS transistor Q2b is connected to the voltage applied terminal of the ferroelectric element both ends short circuit signal FRST.

In addition, the pass switches 62 and 66 are turned ON/OFF according to the clock signal CLK, and the pass switch 68 is turned ON/OFF according to inverted clock signal CLKB (logic inverted signal of the clock signal CLK), among the above-mentioned components. That is, the pass switches 62 and 66 and the pass switch 68 of each other are turned ON/OFF exclusively (complementary). On the other hand, both the pass switches 78 and 82 are turned ON/OFF according to the ferroelectric element write signal E1. As for both the multiplexers 84 and 86, the signal path is switched according to the normal operation signal E2.

Although the drivers for data write (inverters 76 and 80) and the multiplexers 84 and 86 are newly needed in the configuration example of the nonvolatile memory gate 50 shown in FIG. 12, since the occupation area of the nonvolatile memory gate 50 in the instruction processing unit 102 of the nonvolatile CPU 40, the arithmetic processing unit 110, and the calculated result storage unit 104 is only several percent, there is almost no influence of the increase in size given to whole of the nonvolatile CPU 40.

(Operation Timing Chart at the Time of Control of Nonvolatile CPU)

Figure 13:
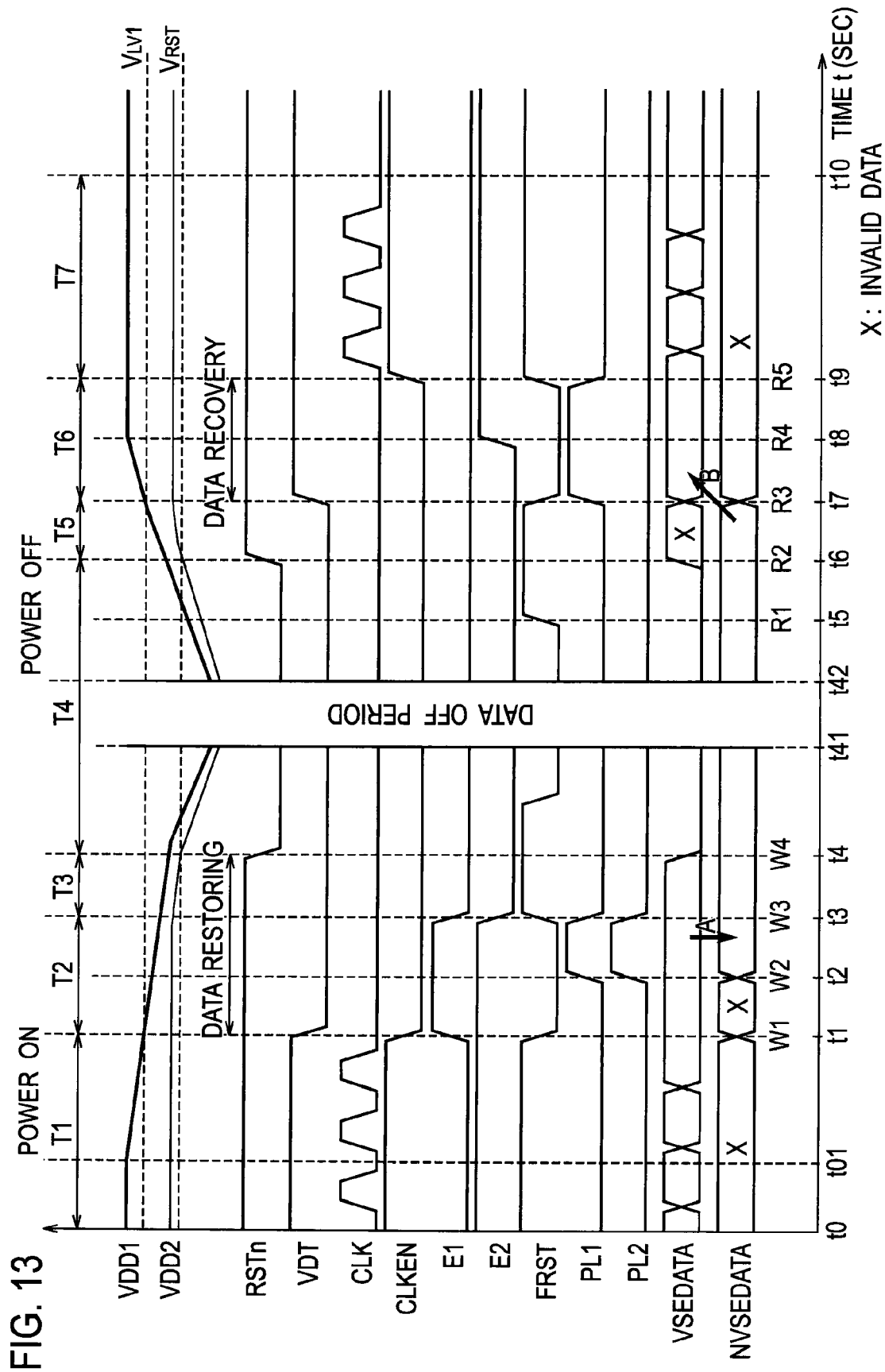
FIG. 13 shows an operation waveform of the data control unit according to the third embodiment of the present invention, and is an operation timing chart when controlling the nonvolatile CPU.

An operation timing chart at the time of control of the nonvolatile CPU 40 which is an operation waveform of the data control unit according to the third embodiment of the present invention is expressed as shown in FIG. 13. In FIG. 13, the power supply variation waveforms of the primary power supply voltage VDD1 and the secondary power supply voltage VDD2 are shown. Corresponding to these power supply variation waveforms, the reset signal RSTn, the voltage level detection signal VDT, the clock signal CLK, the clock enable signal CLKEN, the ferroelectric element write signal E1, the normal operation signal E2, the ferroelectric element both ends short circuit signal FRST, the ferroelectric element driving signals PL1 and PL2, the volatile data signal VSEDATA, and the nonvolatile data signal NVSEDATA are shown.

In the following description, as shown in FIG. 12, the voltage which appears in the connection node of the ferroelectric capacitors 51a and 51b is set to V1, the voltage which appears in the connection node of the ferroelectric capacitors 52a and 52b is set to V2, the voltage which appears in the input terminal of the inverter 70 is set to V3, the voltage which appears in the output terminal of the inverter 70 is set to V4, the voltage which appears in the input terminal of the inverter 72 is set to V5, and the voltage which appears in the output terminal of the inverter 72 is set to V6.

—Normal Operation—

First of all, a normal operation will be explained.

(a) During the period T1 to the time point W1 shown by the time t0 to the time t1, a power supply is in ON state. The reset signal RSTn of negative logic is in OFF state, and the voltage level detection signal VDT is in ON state. In the predetermined time t01 during the time t0 to the time t1, when the power supply is turned OFF, although the voltage of the primary power supply voltage VDD1 drops by a predetermined time constant, the secondary power supply voltage VDD2 is still a fixed state.

The nonvolatile CPU 40 is in a normal operation state. Since the ferroelectric element both ends short circuit signal FRST is set to "H (high-level)", the MOS transistors Q1a, Q1b, Q2a, and Q2b are turned ON, and between each both terminals of the ferroelectric capacitors 51a, 51b, 52a, and 52b is short-circuited, it is in the state where no voltage is applied to these ferroelectric capacitors 51a, 51b, 52a, and 52b. In addition, the ferroelectric element driving signals PL1 and PL2 applied to the first plate line and the second plate line are all set to "L (low level)".

Moreover, till the point in time W1, since the ferroelectric element write signal E1 is set to "L" and the pass switch 78 and the pass switch 82 are turned OFF, each driver for data write (inverters 76 and 82 in the example of FIG. 12) is invalid.

Moreover, till the point in time W1, since the normal operation signal E2 is set to "H" and the first input terminal (1) of the multiplexer 84 and the multiplexer 86 is selected, the normal loop is formed in the loop structure unit LOOP (the part surrounded by 84, 72, 86, and 70 in FIG. 12).

In the volatile storage element 35, when the clock signal CLK is high-level, the inverter 61 is turned OFF, the pass switch 62 is turned ON, the pass switch 66 is turned ON, and the pass switch 68 is turned OFF. Therefore, in the loop composed of the inverter 60 and the inverter 64, when the clock signal CLK changes from the low level to the high level, the imported data input signal D is held. And, in the loop structure unit (84, 72, 86, 70), the data is passed in that condition and the data output signal Q is outputted from the volatile storage element 35.

On the other hand, when the clock signal CLK is the low level, in the loop structure unit (84, 72, 86, 70), the data input signal D imported when the clock signal CLK changed from the high level to the low level is held, and the data output signal Q is outputted.

—Data Restoring Operation to Ferroelectric Element—

Next, a data restoring operation to the ferroelectric element will be explained.

(b) In the time t1, when the value of the primary power supply voltage VDD1 reaches the VDD1 detection voltage level $V_{LV}1$, the voltage level detection signal VDT is turned OFF. As for the reset signal RSTn, the ON state is held.

(c) In the period T2 of the time points W1 to W3 shown by the time t1 to the time t3, and the period T3 of the time points W3 to W4 shown by the time t3 to the time t4, the nonvolatile CPU 40 is in a data restoring state, and a data write operation to the ferroelectric element in the nonvolatile memory gate 50 is executed.

The clock signal CLK is set to "L" and the inverted clock signal CLKB is set to "H". Therefore, the pass switch 66 is turned OFF and the pass switch 68 is turned ON.

In particular, in the period of the time points W2 to W3 shown by the time t2 to the time t3, a data write operation from the volatile storage element (VSE) 35 to the nonvolatile storage elements (NVSE) $36_1$ and $36_2$ is executed. This data write operation is indicated by the arrow A from the volatile data signal VSEDATA to the nonvolatile data signal NVSEDATA.

Moreover, in the time points W1 to W3, the ferroelectric element both ends short circuit signal FRST is set to "L", the MOS transistors Q1a, Q1b, Q2a, and Q2b are turned OFF, and it is in the state in which the voltage impression toward the ferroelectric capacitors 51a, 51b, 52a, and 52b is possible.

Moreover, in the time points W1 to W3, the ferroelectric element write signal E1 is set to "H", and the pass switch 78 and the pass switch 82 are turned ON. Therefore, each driver for data write (inverters 76 and 82 in the example of FIG. 12) is validated.

In addition, in the time points W1 to W3, since the normal operation signal E2 is set to "H" and the first input terminal (1) of the multiplexer 84 and the multiplexer 86 is selected similarly till then, the normal loop is formed in the loop structure unit LOOP (a part surrounded by 84, 72, 86, and 70 in FIG. 12).

Moreover, in the time points W1 to W2, the ferroelectric element driving signal PL1 applied to the first plate line and the ferroelectric element driving signal PL2 applied to the second plate line are set to "L", and the ferroelectric element driving signals PL1 and PL2 is set to "H". That is, the same pulse voltage is applied toward the first plate line and the second plate line. The residual polarization state inside the ferroelectric capacitor is set to either the inverted state/non-inverted state by impression of such the pulse voltage.

More specifically based on the example of FIG. 12, at the time W1, since the output signal Q is "H", the node voltage V1 is set to "L", and the node voltage V2 is set to "H". Therefore, in the time points W1 to W2, while the ferroelectric element driving signal PL1 applied to the first plate line and the ferroelectric element driving signal PL2 applied to the second plate line are set to "L", it is in the state where the voltage is not applied between the both terminals of the ferroelectric capacitors 51a and 51b, is in the state where the voltage of negative polarity is applied between the both terminals of the ferroelectric capacitor 52a, and is in the state where the voltage of positive polarity is applied between the both terminals of the ferroelectric capacitor 52b.

On the other hand, in the time points W2 to W3, while the ferroelectric element driving signal PL1 applied to the first plate line and the ferroelectric element driving signal PL2 applied to the second plate line are set to "H", it is in the state where the voltage is not applied between the both terminals of the ferroelectric capacitors 52a and 52b, is in the state where the voltage of positive polarity is applied between the both terminals of the ferroelectric capacitor 51a, and is in the state where the voltage of negative polarity is applied between the both terminals of the ferroelectric capacitor 51b.

Thus, the residual polarization state inside the ferroelectric element is set to either the inverted state/non-inverted state by applying the pulse voltage toward the first plate line and the second plate line. In addition, between the ferroelectric capacitors 51a and 51b and between the ferroelectric capacitors 52a and 52b, the mutual residual polarization state becomes reverse. Moreover, between the ferroelectric capacitors 51a and 52a and between the ferroelectric capacitors 51b and 52b, the mutual residual polarization state also becomes reverse.

(d) In the period T3 of the time points W3 to W4 shown by the time t3 to the time t4, it is in a power supply cutoff waiting state. In the time point W3, since the ferroelectric element both ends short circuit signal FRST is set to "1" again, the MOS transistors Q1a, Q1b, Q2a, and Q2b are turned ON, and between each both terminals of the ferroelectric capacitors 51a, 51b, 52a, and 52b is short-circuited, it is in the state where no voltage is applied to these ferroelectric capacitors 51a, 51b, 52a, and 52b. At this time, each of the ferroelectric element driving signal PL1 applied to the first plate line and the ferroelectric element driving signal PL2 applied to the second plate line are set to "L".

Moreover, in time point W3, since the ferroelectric element write signal E1 is again set to "L", and the pass switch 78 and the pass switch 82 are turned OFF, each driver for data write (inverters 76 and 80 in the example of FIG. 12) is invalid. In addition, although it is unquestioned about the normal operation signal E2, it is set to "L" in the example of FIG. 13.

(e) Next, in the period T4 of the time points W4 to W6 shown by the time t4 to the time t6, it is in a power supply cutoff state. That is, at the time point W4 shown by the time t4, the secondary power supply voltage VDD2 reaches the reset voltage level $V_{RST}$. Furthermore, when the value of the primary power supply voltage VDD1 drops, and the value of the secondary power supply voltage VDD2 becomes lower than the reset voltage level $V_{RST}$, the nonvolatile CPU 40 is in the power supply cutoff state. The reset signal RSTn of negative logic is turned to the ON state, the voltage level detection signal VDT is turned to the OFF state, and the ferroelectric element write signal E1, the normal operation signal E2, and the ferroelectric element driving signals PL1 and PL2 are turned to the OFF state. In particular, the nonvolatile CPU 40 connected to the secondary power source line VDL2 is turned to the power OFF state in the predetermined time t41 in the time t4 to the time t5, and the nonvolatile CPU40 is turned to the power OFF state during the time t41 to the time t42.

The ferroelectric element both ends short circuit signal FRST is maintained by "H" from time point W3, the MOS transistors Q1a, Q1b, Q2a, and Q2b are turned ON, and between each both terminals of the ferroelectric capacitors 51a, 51b, 52a, and 52b are short-circuited. Therefore, since it is in the state where no voltage is applied to the ferroelectric capacitors 51a, 51b, 52a, and 52b, even when it is a case where the voltage variation occurs at the time of the power supply cutoff, the voltage which is not aimed to the ferroelectric capacitors 51a, 51b, 52a, and 52b is not applied, thereby it becomes possible to avoid data deformation.

—Data Recovery Operation from Ferroelectric Element—

Next, a data recovery operation from the ferroelectric element will be explained.

(f) The power supply is turned ON in the time t42. The operation waveform of the primary power supply voltage VDD1 and the secondary power supply voltage VDD2 rises, and when the value of the secondary power supply voltage VDD2 reaches the reset voltage level $V_{RST}$, the reset signal RSTn is turned OFF.

(g) The time points R1 to R5 shown by the time t5 to the time t9, the clock signal CLK is set to "L" and the inverted clock signal CLKB is set to "H". Therefore, the pass switch 66 is turned OFF and the pass switch 68 is turned ON. In addition, at the time point R1, each of the ferroelectric element driving signal PL1 applied to the first plate line and the ferroelectric element driving signal PL2 applied to the second plate line are set to "L".

(h) In the period T5 of the time points of R2 to R3 shown by the time t6 to the time t7, it is in a power recovery waiting state. At the time point R2, each the ferroelectric element write signal E1 and the normal operation signal E2 are in the state of "L" (that is, a state where the driver for data write becomes invalid and the normal loop is formed in the loop structure unit LOOP), and the secondary power supply voltage VDD2 reaches the reset voltage level $V_{RST}$. Furthermore, when the value of the primary power supply voltage VDD1 rises, and the value of the secondary power supply voltage VDD2 becomes higher than the reset voltage level $V_{RST}$, the nonvolatile CPU 40 is in the power recovery waiting state.

(i) Next, in the time t7, when the value of the primary power supply voltage VDD1 reaches the VDD1 detection voltage level $V_{LV}1$, the voltage level detection signal VDT is turned ON. At this point, the data recovery operation is started.

(j) Next, in the period of the time t7 to the time t10, the ON state is held for the primary power supply voltage VDD1 and the secondary power supply voltage VDD2. Immediately after the time t7, the ferroelectric element driving signal PL1 is turned from the OFF state to the ON state, and data reading operation shown by the arrow B from the nonvolatile data signal NVSEDATA to the volatile data signal VSEDATA is executed.

In particular, in the period T6 at the time points R3 to R5, data read-out from the nonvolatile storage elements (NVSE) $36_1$ and $36_2$ to the volatile storage element (VSE) 35 is executed.

At the time point R3, whereas the ferroelectric element both ends short circuit signal FRST is set to "L", the MOS transistors Q1a, Q1b, Q2a, and Q2b are turned OFF, and it is turned to the state in which the voltage impression toward the ferroelectric capacitors 51a, 51b, 52a, and 52b is possible, while the ferroelectric element driving signal PL2 applied to the second plate line is maintained by "L", the ferroelectric element driving signal PL1 applied to the first plate line is set to "H". By impression of such the pulse voltage, the voltage signal corresponding to the residual polarization state in the ferroelectric capacitor appears as the node voltage V1 and the node voltage V2.

More specifically based on the example of FIG. 12, a comparatively low voltage signal (the logic is hereinafter referred to "WL (Weak Low)") appears as the node voltage V1, and a comparatively high voltage signal (the logic is hereinafter referred to "WH (Weak Hi)") appears as the node voltage V2. That is, it becomes a shape which the voltage difference according to the difference of the residual polarization state in the ferroelectric capacitor occurs, between the node voltage V1 and the node voltage V2.

At this time, at the time points R3 to R4, since the normal operation signal E2 is set to "L", and the multiplexer 84 and the second input terminal (0) of the multiplexer 86 is selected, the logic of the node voltage V3 is turns to WL, and the logic of the node voltage V4 is turns to WH. Moreover, the logic of the node voltage V5 is turned to WH, and the logic of the node voltage V6 is turned to WL. Thus, at the time points R3 to R4, the node voltages V1 to V6 of each part is still in an unstable state (state where logic inverted in the inverter 76 and the inverter 80 is not performed thoroughly, and the output logic does not become "L"/"H" securely).

At the time point R4, since the normal operation signal E2 is set to "H" and the multiplexer 84 and the first input terminal (1) of the multiplexer 86 is selected, the normal loop is formed in the loop structure unit LOOP. With the change of such a signal path, the output terminal (logic: WH) of the inverter 70 and the input terminal (logic: WH) of the inverter 72 are connected, and the output terminal (logic: WL) of the inverter 72 and the input terminal (logic: WL) of the inverter 70 are connected. Therefore, mismatching is not occurred in the signal logic (WH/WL) of each node. Hereinafter, while the normal loop is formed in the loop structure unit LOOP, the inverter 72 tends to pull up the output logic to "H" in response to the input of the logic WL, and the inverter 70 tends to pull down the output logic to "L" in response to the input of the logic WH. As a result, the output logic of the inverter 72 is settled by "L" from the unstable logic WL, and the output logic of the inverter 70 is settled by "H" from the unstable logic WH.

At the time point R4, it becomes a shape where the signal (potential difference of the node voltage V1 and the node voltage V2) read from the ferroelectric capacitor is amplified in the loop structure unit LOOP, with the loop structure unit LOOP being applied into the normal loop, and the held data before power supply cutoff is recovered.

At the time point R5, since the ferroelectric element both ends short circuit signal FRST is again set to "H", the MOS transistors Q1a, Q1b, Q2a, and Q2b are turned ON, and between each both terminals of the ferroelectric capacitors 51a, 51b, 52a, and 52b is short-circuited, it is in the state where no voltage is applied to these ferroelectric capacitors 51a, 51b, 52a, and 52b. At this time, each of the ferroelectric element driving signal PL1 applied to the first plate line and the ferroelectric element driving signal PL2 applied to the second plate line are set to "L". Therefore, it recovers to the normal operation state as well as the time point W1 or before.

According to the third embodiment of the present invention, also in the case where the controlled system is applied to the nonvolatile CPU, when detecting the power supply cutoff/turn-on and outputting the signal for requesting the backup (data restoring/recovery) of data, the data control unit which can secure the period for sufficient backup process which can be processed can be provided.

According to the data control unit according to the third embodiment of the present invention, when the controlled system is applied to the nonvolatile CPU which has a power source line of two systems, the capacity of the capacitor for performing voltage securing after the power supply cutoff can be applied small.

Moreover, according to the data control unit according to the third embodiment of the present invention, when the controlled system is applied to the nonvolatile CPU and the value of power supply voltage is varied by the noise on the power source line, etc., a useless backup process (data restoring/recovery) can be suppressed.

Other Embodiments

While the present invention is described in accordance with the aforementioned embodiments, it should not be understood that the description and drawings that configure part of this disclosure are to limit the present invention. This disclosure makes clear a variety of alternative embodiments, working examples, and operational techniques for those skilled in the art.

Accordingly, the technical scope of the present invention is defined by the claims that appear appropriate from the above explanation, as well as by the spirit of the invention. Various modifications will become possible for those skilled in the art after receiving the teachings of the present disclosure without departing from the scope thereof.

INDUSTRIAL APPLICABILITY

Since the data control unit of the present invention can detect the voltage level of power supply cutoff/turn-on and sufficient time for backup (data restoring/recovery) of the data of the controlled target circuit can be secured, the data control unit of the present invention can be applied to wide fields as the controlled target circuit, such as processors, such as a logic operation circuit, a logic unit, CPU, MPU, and DSP, and a game machine, and a mobile computing device, and becomes advantageous in respect of the data protection at the time of battery exhaustion, etc. in particular in battery powered devices.

Reference Signs List
2, 3, 10, 30; controlled target circuit
4; power supply voltage converter
12; data control unit
14; power supply voltage converter
15; detection/Control unit
16; reset signal generation unit
18; voltage level detection unit
20; control signal generation unit
32; main operational unit
34, 341, 342; data interface control unit
35; volatile storage element (VSE)
36, 361, 362; nonvolatile storage element(NVSE)
40; nonvolatile CPU
42; clock generation device
44; AND gate
50; nonvolatile memory gate
51a, 51b, 52a, 52b; ferroelectric capacitor
54, 56, 58; logic circuit block
60, 61, 64, 70, 72, 74, 76, 80; inverter
62, 66, 68, 78, 82; pass switch
84, 86; multiplexer
102; instruction processing unit
104; calculated result storage unit
106, 108; switch block
110; arithmetic processing unit
112; program/data input/output line
112a; program/data input terminal
112b; program/data output terminal
114; control signal input/output line
114a; control signal output terminal
114b; control signal input terminal
D; data input signal
Q; data output signal
CLK; clock signal
CLKB; inverted clock signal
E1; ferroelectric element write signal
E2; normal operation signal
FRST; ferroelectric element both ends short circuit signal
PL1, PL2; ferroelectric element driving signal
VDD; power supply voltage
VDD1; primary power supply voltage
VDD2; secondary power supply voltage
VDL1; primary power supply line
VDL2; secondary power supply line
TW1, TW2; period
RSTn; reset signal (negative logic)
VDT; voltage level detection signal
CLS; control signal
$V_{LV}1$; VDD1 detecting voltage level
$V_{LV}2$; VDD2 detecting voltage level
$V_{RST}$; reset voltage level
C1, C2; capacitor
DRCS; data restoring control signal
DSCS; data recovery control signal
ACS; arithmetic control signal

The invention claimed is:

1. A data control unit comprising:
a controlled target circuit which has a nonvolatile storage element and performs a predetermined operation;
a power supply voltage converter for converting a primary power supply voltage into a secondary power supply voltage; and
a detection/control unit for detecting variation of a potential of each of the primary power supply voltage and the secondary power supply voltage, and outputting a control signal which controls a transfer of data in the controlled target circuit to the nonvolatile storage element toward the controlled target circuit.

2. The data control unit according to claim 1, wherein a predetermined voltage level of the primary power supply voltage is used for detection of power supply cutoff.

3. The data control unit according to claim 1, wherein a predetermined voltage level of the secondary power supply voltage is used for reset.

4. The data control unit according to claim 2, wherein a process which backs up data of the controlled target circuit to the nonvolatile storage element is executed during a period in which the primary power supply voltage drops after detection of the power supply cutoff.

5. The data control unit according to claim 4, wherein the period during which the primary power supply voltage drops is from a time point of the primary power supply voltage being less from the predetermined voltage level set to the primary power supply voltage to a time point of the secondary power supply voltage being less from the predetermined voltage level set to the secondary power supply voltage.

6. The data control unit according to claim 1, wherein the detection/control unit comprises:
a voltage level detection unit which inputs the primary power supply voltage and outputs a voltage detection signal, a value of the voltage detection signal being changed when the primary power supply voltage reaches to the predetermined voltage level of the primary power supply voltage;
a reset signal generation unit which inputs the secondary power supply voltage and outputs a reset signal, a value of the reset signal being changed when the secondary power supply voltage reaches to the predetermined voltage level of the secondary power supply voltage; and
a control signal generation unit which inputs the voltage detection signal and the reset signal, and outputs the control signal to the controlled target circuit based on the inputted voltage detection signal and the inputted reset signal.

7. The data control unit according to claim 1, wherein the detection/control unit comprises:
a voltage level detection unit which inputs the primary power supply voltage and outputs a voltage detection signal, a value of the voltage detection signal being changed when the primary power supply voltage reaches to the predetermined voltage level of the primary power supply voltage;

a reset signal generation unit which inputs the secondary power supply voltage and outputs a reset signal, a value of the reset signal being changed when the secondary power supply voltage reaches to the predetermined voltage level of the secondary power supply voltage; and a control signal generation unit which inputs the voltage detection signal and the reset signal, and outputs a data restoring control signal for making the data of the controlled target circuit nonvolatile, and a data recovery control signal for recovering to the state where the data made nonvolatile can be processed, based on the inputted voltage detection signal and the inputted reset signal.

8. The data control unit according to claim 7, wherein the controlled target circuit further comprises:

a main operational unit; and a data interface control unit for controlling a exchange of data between the main operational unit and the nonvolatile storage element.

9. The data control unit according to claim 8, wherein the reset signal is inputted into the main operational unit, the data interface unit, and the nonvolatile storage element, and the data restoring control signal and the data recovery control signal are inputted into the data inter face control unit.

10. A data control unit comprising:

a power supply voltage converter for converting a primary power supply voltage into a secondary power supply voltage;

a voltage level detection unit for detecting variation of a potential of each of the primary power supply voltage and the secondary power supply voltage; and a control signal generation unit for outputting a data restoring control signal for requesting restoration of data of a controlled target circuit when a voltage level of cutoff of the power supply is detected, and outputting a data recovery control signal for requesting recovery of data of the controlled target circuit when a voltage level of turn-on of the power supply is detected, based on the variation of the potential of each of the primary power supply voltage and the secondary power supply voltage detected in the voltage level detection unit.

11. The data control unit according to claim 10, wherein a data restoring control signal is outputted when a primary power supply voltage is less than a predetermined voltage level, and a data recovery control signal is outputted when the primary power supply voltage is more than the predetermined voltage level.

12. A data control unit comprising:

a nonvolatile CPU including a nonvolatile storage element;

a power supply voltage converter for converting a primary power supply voltage into a secondary power supply voltage;

a voltage level detection unit which inputs the secondary power supply voltage and outputs a reset signal, a value of the voltage detection signal being changed when the primary power supply voltage reaches to the predetermined voltage level of the primary power supply voltage;

a reset signal generation unit which inputs the secondary power supply voltage and outputs a reset signal, a value of the reset signal being changed when the secondary power supply voltage reaches to the predetermined voltage level of the secondary power supply voltage;

a control signal generation unit which inputs the voltage detection signal and the reset signal, and outputs a control signal and a clock enable signal to the nonvolatile CPU, based on the inputted voltage detection signal and inputted reset signal;

a clock generation device for outputting a clock signal; and a logic unit for generating an output signal for operating the nonvolatile CPU based on the clock enable signal and the clock signal.

13. A data control unit comprising:

a primary power supply line to which a primary power supply voltage is supplied;

a secondary power source line in which a secondary power supply voltage is supplied;

a voltage converter which is placed between the primary power supply line and the secondary power source line, and converts the primary power supply voltage into the secondary power supply voltage;

a voltage level detection unit which is connected to the primary power supply line, and outputs a voltage level detection signal, a value of the voltage level detection signal being changed when the primary power supply voltage reaches to the predetermined voltage level of the primary power supply voltage;

a reset signal generation unit which is connected to the secondary power source line, and outputs a reset signal, a value of the reset signal being changed when the secondary power supply voltage reaches to the predetermined voltage level of the secondary power supply voltage; and a control signal generation unit which receives the voltage level detection signal and the reset signal, and outputs a control signal based on the received voltage level detection signal and the received reset signal.

14. The data control unit according to claim 13, wherein the control signal is a data restoring control signal and a data recovery control signal.

* * * * *